(12) United States Patent
Liang et al.

(10) Patent No.: US 10,432,047 B2
(45) Date of Patent: Oct. 1, 2019

(54) ASYMMETRICAL SURFACE GROOVE PATTERNS FOR PERMANENT MAGNET MACHINE ROTORS

(71) Applicant: FORD GLOBAL TECHNOLOGIES, LLC, Dearborn, MI (US)

(72) Inventors: Feng Liang, Troy, MI (US); Lusu Guo, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 15/664,626

(22) Filed: Jul. 31, 2017

(65) Prior Publication Data

US 2019/0036398 A1    Jan. 31, 2019

(51) Int. Cl.
*H02K 1/27* (2006.01)
*H02K 21/14* (2006.01)

(52) U.S. Cl.
CPC ........... *H02K 1/276* (2013.01); *H02K 1/2766* (2013.01); *H02K 21/14* (2013.01); *H02K 2213/03* (2013.01)

(58) Field of Classification Search
CPC .. H02K 1/00; H02K 1/06; H02K 1/14; H02K 1/22; H02K 1/27; H02K 1/276; H02K 1/2766; H02K 21/12; H02K 21/14; H02K 21/16; H02K 21/18; H02K 21/20

USPC ........... 310/156.48, 156.49, 156.55–156.57, 310/216.004, 216.011, 216.012
See application file for complete search history.

(56) References Cited

U.S. PATENT DOCUMENTS

| | | | |
|---|---|---|---|
| 8,487,495 B2 | 7/2013 | Takizawa | |
| 8,546,990 B2 | 10/2013 | Suzuki et al. | |
| 2004/0217667 A1* | 11/2004 | Popov | H02K 1/146 310/156.57 |
| 2011/0163624 A1* | 7/2011 | Hori | H02K 1/276 310/156.53 |
| 2016/0365762 A1* | 12/2016 | Liang | H02K 1/2706 |

FOREIGN PATENT DOCUMENTS

| | | |
|---|---|---|
| CN | 104767338 A | 7/2015 |
| JP | 2015119547 A | 6/2015 |

* cited by examiner

*Primary Examiner* — Tran N Nguyen
(74) *Attorney, Agent, or Firm* — David Kelley; Brooks Kushman P.C.

(57) ABSTRACT

A rotor for a permanent magnet machine includes a first and second stack of same laminations. The laminations are configured to rotate about an axis and define poles and axial grooves on a circumferential surface that are asymmetric about a centerline of each of the poles. The stacks are coupled such that the second stack is flipped relative to the first stack and centerlines of the first stack are aligned with centerlines of the second stack.

20 Claims, 6 Drawing Sheets

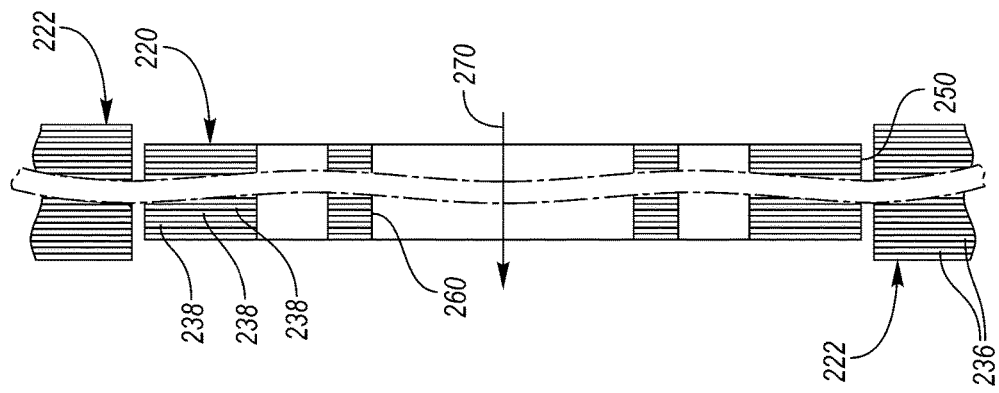
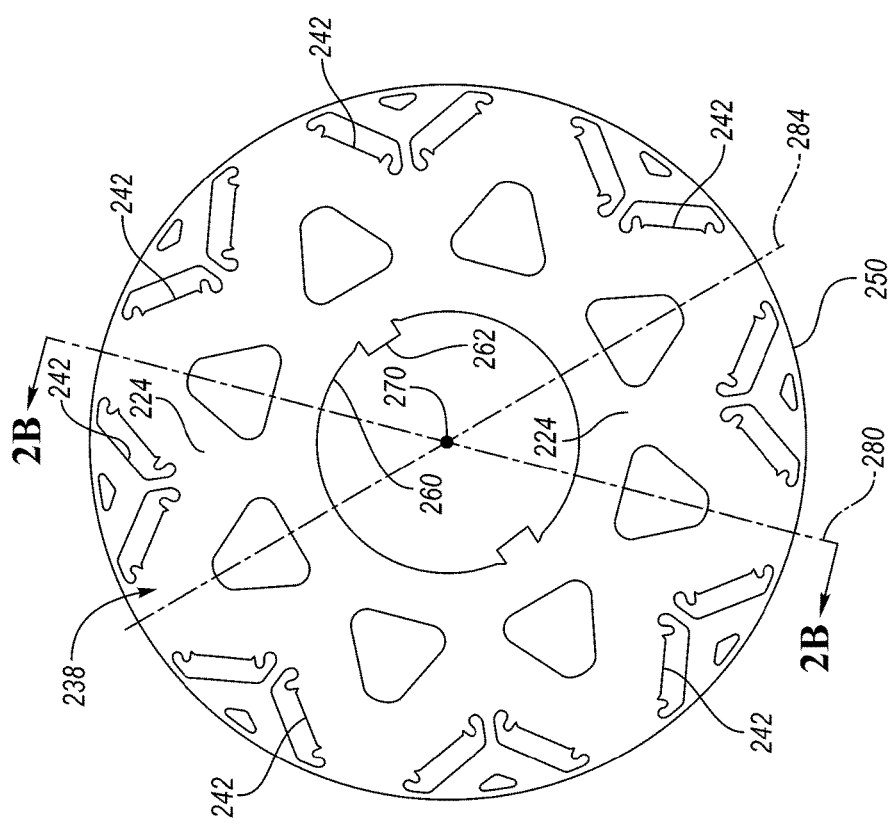
FIG. 2B
FIG. 2A

ASYMMETRICAL SURFACE GROOVE PATTERNS FOR PERMANENT MAGNET MACHINE ROTORS

TECHNICAL FIELD

This application generally relates to rotor configurations for permanent magnet machines.

BACKGROUND

Hybrid-electric and electric vehicles utilize one or more electric machines to provide propulsion for the vehicle. A variety of electric machine technologies are available for such applications. Permanent magnet machines are a typical choice for vehicle applications. The permanent magnet machine includes a stator and a rotor. The rotor is constructed with permanent magnets. Coils in the stator are energized to create an electromagnetic flux that interacts with electromagnetic flux created by the permanent magnets of the rotor. The interaction of the fluxes causes the rotor to rotate. Due to various motor design characteristics, the interacting electromagnetic fluxes create a torque that is comprised of harmonic components. The torque may be described as a summation of components having different frequencies. This is observed as a ripple or oscillation in the torque. The torque ripple or torque oscillation causes vibration and noise.

SUMMARY

A permanent magnet machine includes a rotor, configured to rotate about an axis, comprising first and second stacks of same laminations defining poles and axial grooves on a circumferential surface that are asymmetric about a centerline of each of the poles, and coupled such that the second stack is flipped relative to the first stack and centerlines of the first stack are aligned with centerlines of the second stack.

A rotor for a permanent magnet machine includes first and second stacks of same laminations, configured to rotate about an axis and defining poles and axial grooves on a circumferential surface that are asymmetric about a centerline of each of the poles, and coupled such that the second stack is flipped relative to the first stack and centerlines of the first stack are aligned with centerlines of the second stack. The rotor may further include a third stack of the same laminations coupled such that the second stack is between the first stack and the third stack and the axial grooves of the third stack are aligned with those of the first stack.

A rotor for a permanent magnet machine includes first and second stacks of same laminations, configured to rotate about an axis and defining poles and axial grooves on a circumferential surface that are asymmetric about a centerline of each of the poles, oriented such that the axial grooves are aligned. The rotor further includes a third stack of the same laminations, flipped relative to the first and second stacks and disposed between the first and second stacks such that axial grooves defined by the third stack are unaligned with those of the first and second stacks.

The laminations may further define poles at predetermined arc lengths about the axis. The axial grooves may be defined by a width, and the width associated with at least two of the axial grooves associated with each of the poles may be different. The axial grooves may be defined by a depth, and the depth associated with at least two of the axial grooves associated with each of the poles may be different. The width and depth associated with at least two of the axial grooves associated with each of the poles may be different. The axial grooves may be defined such that there are two grooves associated with each of the poles.

The axial grooves may be asymmetrically positioned about the centerline to reduce torque ripple of the permanent magnet machine relative to symmetrically positioned axial grooves. The axial grooves may be asymmetrically positioned about the centerline to increase an average torque of the permanent magnet machine relative to symmetrically positioned axial grooves.

BRIEF DESCRIPTION OF THE DRAWINGS

FIG. 2A is an example of a top view of a rotor lamination.

FIG. 2B is an example of a side view of a rotor constructed of a series of rotor laminations.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
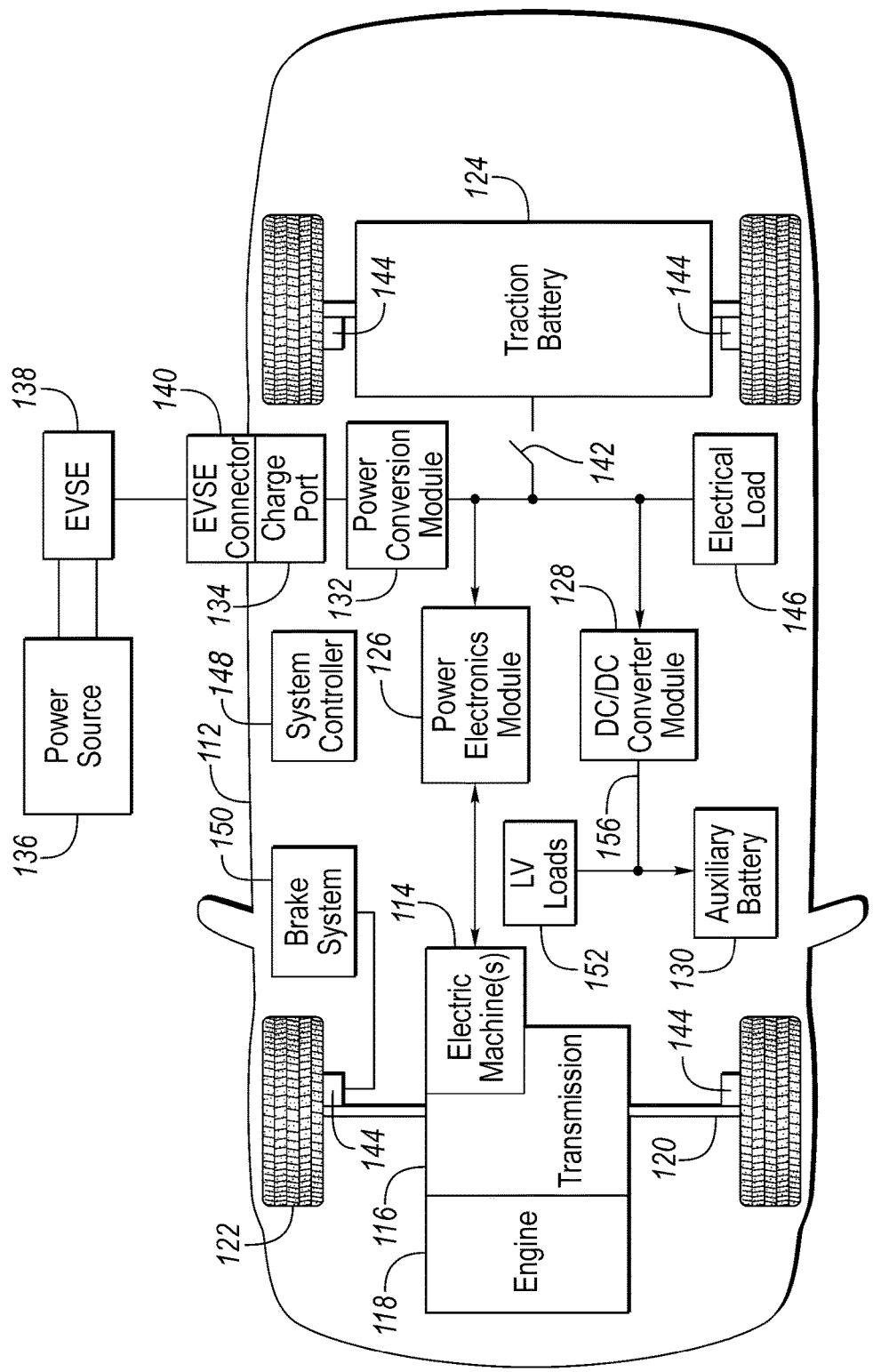
FIG. 1 is a diagram of a hybrid vehicle illustrating typical drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

The electric machines 114 may be Interior Permanent Magnet (IPM) machines that include a stator and a rotor. FIG. 2A depicts an example rotor lamination 238 and FIG. 2B depicts a side view of a stator 222 and rotor 220 configurations having multiple rotor laminations 238 and multiple stator laminations 236 arranged in an axially stacked relationship. The rotor laminations 238 may define a circular central opening 260 for accommodating a drive shaft with a keyway that may receive a drive key 262. The rotor laminations 238 may define a plurality of magnet openings 242 that are symmetrically disposed with respect to adjacent pairs of magnet openings 242.

A plurality of rotor sectors 224 corresponding to magnetic poles of the rotor may be defined by a plurality of inter-polar axes (e.g., 280, 284) emanating from a central axis 270 of rotation to an outer surface 250 of the rotor lamination 238. Each of the sectors 224 may include a pair of magnet openings 242. The inter-polar axes (e.g., 280, 284) may be positioned to be midway between adjacent pairs of magnet openings 242. Note that FIG. 2A only shows two of the possible inter-polar axes 280, 284 and does not show all possible inter-polar axes. FIG. 2B depicts a series of axially stacked rotor laminations 238 that are stacked along the central axis 270 about which the rotor 220 is configured to rotate.

Figure 3:
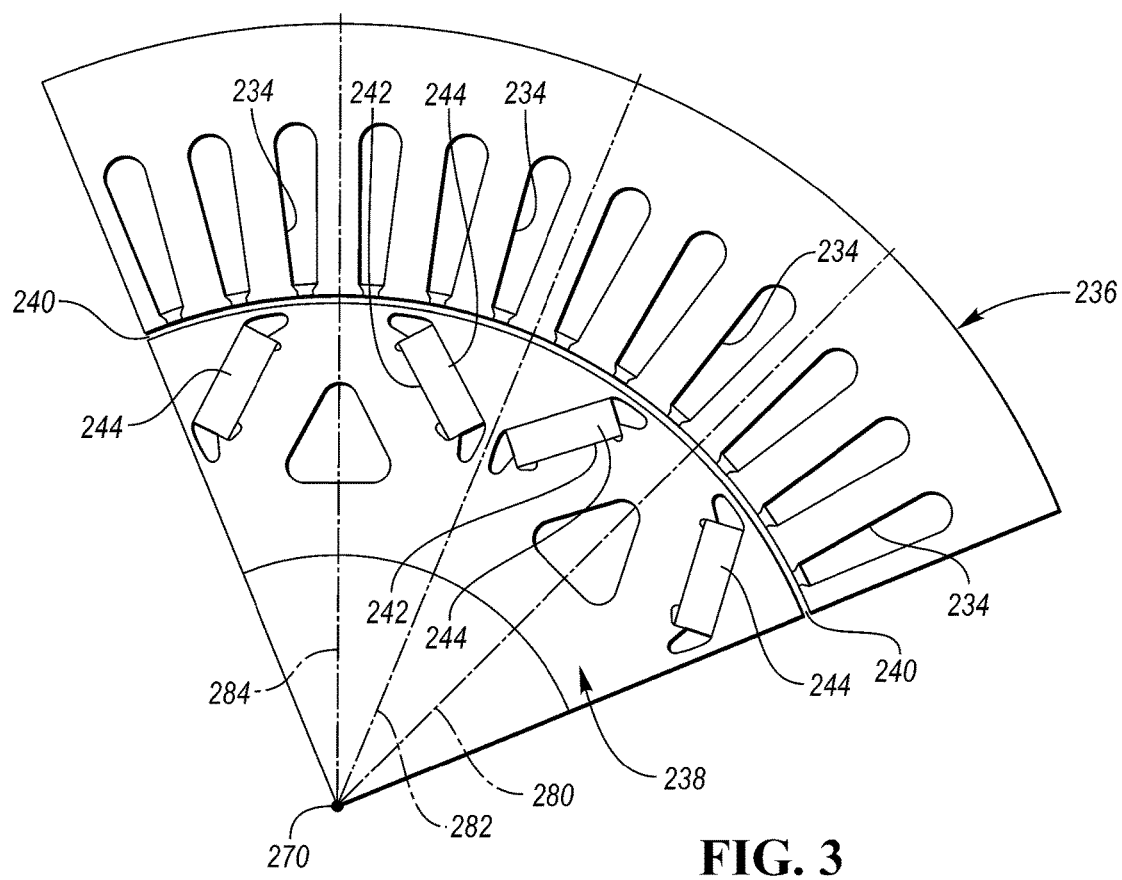
FIG. 3 is an example of a partial rotor and stator lamination.

FIG. 3 depicts a partial radial cross-sectional view of a possible construction of the rotor 220 and the stator 222. A partial stator lamination 236 and a partial rotor lamination 238 are depicted in FIG. 3. The rotor laminations 238 and the stator laminations 236 may be comprised of a ferrous alloy. A small air gap 240 is located between the inner periphery of the stator laminations 236 and the outer periphery 250 of the rotor laminations 238. The stator laminations 236 may define radially extending openings 234 for receiving stator conductors or phase wiring.

The rotor laminations 238 may define symmetrically positioned magnet openings 242 near the outer periphery 250 of each rotor lamination 238. Each magnet opening 242 may be configured to receive a magnet 244. Any number of laminations in a given design may be used, depending on design choice. The rotor laminations 238 and the stator laminations 236 may be arranged in a stack along the axis 270 of rotation. The axially stacked rotor laminations 238 and the magnets 244 may define a plurality of magnetic poles distributed about the axis 270.

The stator 236 may have conductors disposed in the radially extending openings 234 to form windings. The stator 222 may be comprised of an iron core made of a stack of stator laminations 236 and a winding arrangement for conductors that carry an excitation current. Current flowing through the stator winding generates a stator electromagnetic flux. The stator flux may be controlled by adjusting the magnitude and frequency of the current flowing through the stator windings. Because the stator windings are contained in openings 234 rather than a uniform sinusoidal distribution along the inner circumference of the stator, there may be harmonic fluxes in the stator flux.

The rotor 220 may be comprised of an iron core made of a stack of rotor laminations 238 and sets of permanent magnets 244 inserted within holes or cavities 242 that are defined by the iron core. The permanent magnets 244 in the rotor 220 may generate a rotor electromagnetic flux. The rotor flux may include harmonic fluxes due to shapes and sizes of the discrete permanent magnets. The stator flux and the rotor flux may be distributed in the air-gap 240. Interaction between the stator flux and the rotor flux causes the rotor 220 to rotate about the axis 270.

Poles of the rotor 220 may be geometrically defined to correspond to the sectors 224 defined by the rotor laminations 238. Each of the poles may be represented by a sector 224. A pole location may be generally defined by a center-pole axis 282 that extends radially from the axis 270 toward the outer surface 250 of the rotor 238 along a midpoint between adjacent magnet openings 242 that comprise a pair. The inter-polar axes (e.g., 280, 284) may extend radially from the axis 270 toward the outer surface 250 of the rotor 238 between adjacent poles. An angular distance between two adjacent poles may define a pole pitch parameter. The arc length on the circumferential rotor surface 250 between two adjacent poles of the rotor may be referred to as the pole pitch. The pole pitch may be measured circumferentially around the outer rotor surface 250 between adjacent center-pole axes 282. Each pole may have an associated surface area on the outer circumferential surface 250 of the rotor 220. Each pole may be represented by the arc length on the surface between adjacent inter-polar axes 280, 284.

An electromagnetic field or signal distribution in the air-gap of an electric machine may be composed of a summation of harmonic components having different pole numbers and magnitudes. Each harmonic component may be represented as a frequency and a magnitude. The signal may include a fundamental component. The fundamental component may be the component having the same number of poles of the rotor.

During operation, the stator and rotor fundamental component fluxes may rotate in the same direction at the same frequency. The interaction between the fundamental component of the stator flux and the rotor flux generates a torque. The stator and rotor harmonic fluxes may have different pole numbers, rotation speeds and directions. As a result, the interaction between the harmonic fluxes generates torque fluctuations, referred to as torque ripple. The torque ripple may have harmonic components having different frequencies. The order of a torque ripple component may be defined as the ratio of the frequency of the torque ripple component to the speed of the rotor in revolutions per second.

One effect of the torque ripple is that it may cause speed oscillations of the rotor. Further, the torque ripple may impact noise and vibration of the motor and components coupled to the electric machine. Higher order torque ripple frequencies may be filtered out by the limited bandwidth of the coupled mechanical system. Lower harmonic frequencies of the torque ripple may give rise to mechanical oscillations in the coupled system. It is desirable to reduce the torque ripple in order to reduce vibration and noise in systems that incorporate electric machines.

An electric machine may be characterized in part by the torque ripple. In general, an electric machine with lower torque ripple is preferred. A technique to adjust the torque ripple may be by skewing the rotor. A skewed rotor may be described as a rotor having at least two sections in which the magnet openings are offset from one another. Each section may have different torque ripple profiles that cancel out the overall torque ripple. While rotor skewing may reduce torque ripple, it has an adverse effect on other properties of the electric machine. For example, skewing the rotor leads to a reduction in output torque of the electric machine. Skewing of the rotor also increases the cost of manufacturing and assembling the electric machine.

A typical outer circumferential surface 250 of the rotor 220 is rounded or smooth. In some applications, the outer surface 250 of the rotor laminations 238 may define a pattern of axial grooves. The grooves may be channels that are oriented parallel to the axis 270. The grooves may span an axial length of the outer surface 250 of the rotor 238. The grooves may impact the air-gap magnetic flux distribution, which in turn impacts the torque ripple. The grooves may be of a rounded shape having a predetermined depth from the outer surface 250. In other configurations, the grooves may have alternate shapes such as rectangular or trapezoidal. The shape of the grooves may be configured to minimize a particular harmonic component. The effect of the grooves is to reduce the magnitude of a selected harmonic component of the torque while not affecting other harmonic components. In many vehicle applications, it may be desirable to reduce the magnitude of several harmonic components. Selection of the groove patterns may be accomplished to minimize any reduction in the average torque of the electric machine.

Laminations that are bonded together that define the same pattern of grooves on the rotor surface 250 may be referred to as a stack. In some rotor configurations, the rotor 220 may be constructed of a single stack. A subset of one or more axial grooves may correspond to the poles of the rotor 220. In some configurations, the axial grooves associated with each pole may have a common pattern. For example, an axial groove may be located at a midpoint (e.g., center-pole axis 282) of each pole. As another example, axial grooves may be defined at a predetermined circumferential distance on either side of the midpoint (e.g., center-pole axis 282) of the pole. The rotor lamination 238 may be configured to define the same groove pattern for each of the poles. The groove pattern defined for the poles may repeat as the outer circumferential surface 250 is followed around the axis 270.

Figure 4A:
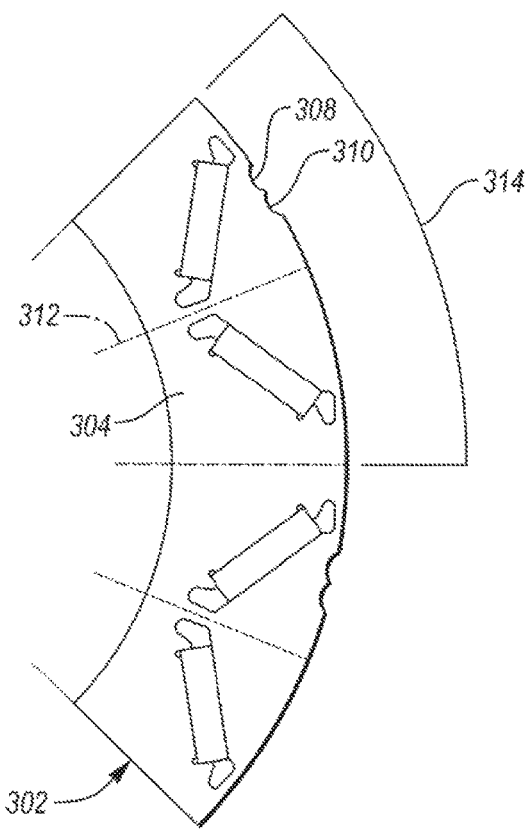
FIG. 4A is a side view of a portion of a rotor lamination viewed from a first side.

In some configurations, the rotor may be comprised of more than one stack. FIG. 4A depicts a portion of a rotor lamination 302 showing two poles of the rotor. An arc length 314 traversing the circumferential surface may correspond to a pole. A centerline 312 may bisect the arc length 314 corresponding to the pole into two equal sectors. A first groove 308 and a second groove 310 may be defined in the outer circumferential surface of the rotor lamination 302. In some configurations, the first groove 308 and the second groove 310 may be asymmetric with respect to the centerline 312. That is, the first groove 308 and the second groove 310 may be positioned at a different distance from the centerline 312. A pattern of grooves may be defined for each of the poles by the positions of the first groove 308 and the second groove 310 relative to the centerline 312. Each of the poles of the rotor may define the same pattern.

Figure 4B:
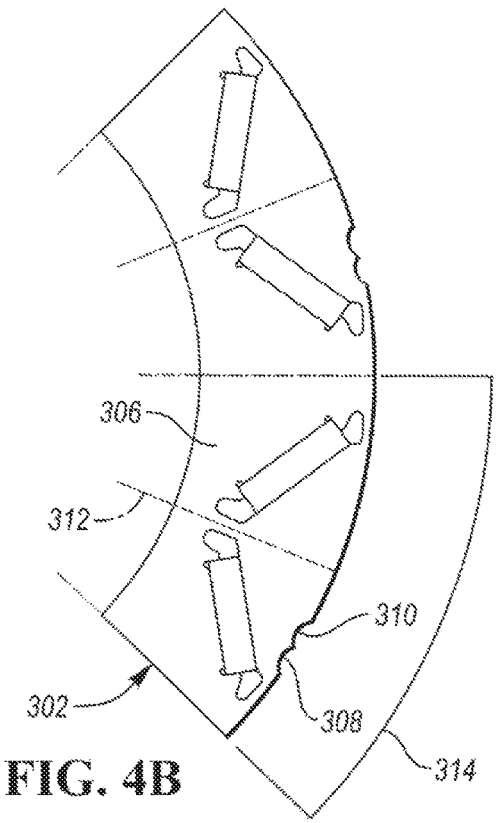
FIG. 4B is a side view of the rotor lamination of FIG. 4A viewed from a second side.

As depicted in FIG. 4A and 4B, the first groove 308 and the second groove 310 are positioned on the same side of the centerline 312. However, the grooves may be positioned on different sides of the centerline 312 at different distances from the centerline 312. FIG. 4A depicts a view in which a first face 304 of the rotor lamination 302 is visible.

FIG. 4B depicts a view in which a second face 306 of the rotor lamination 302 is visible. The second face 306 is located on an opposite side of the rotor lamination 302 as the first face 304. FIG. 4B depicts the rotor lamination 302 after being flipped or overturned such that the second face 306 is made visible. That is, FIG. 4B represents the rotor lamination 302 that is flipped or overturned relative to that of FIG. 4A. When viewed from either the first face 304 or the second face 306, the rotor lamination may appear as a two-dimensional planar surface. A line may be defined that bisects the generally circular lamination and lies within the same plane. Flipping or overturning the rotor lamination rotates the rotor lamination 180 degrees about the line such that the opposite side is viewed.

Figure 5:
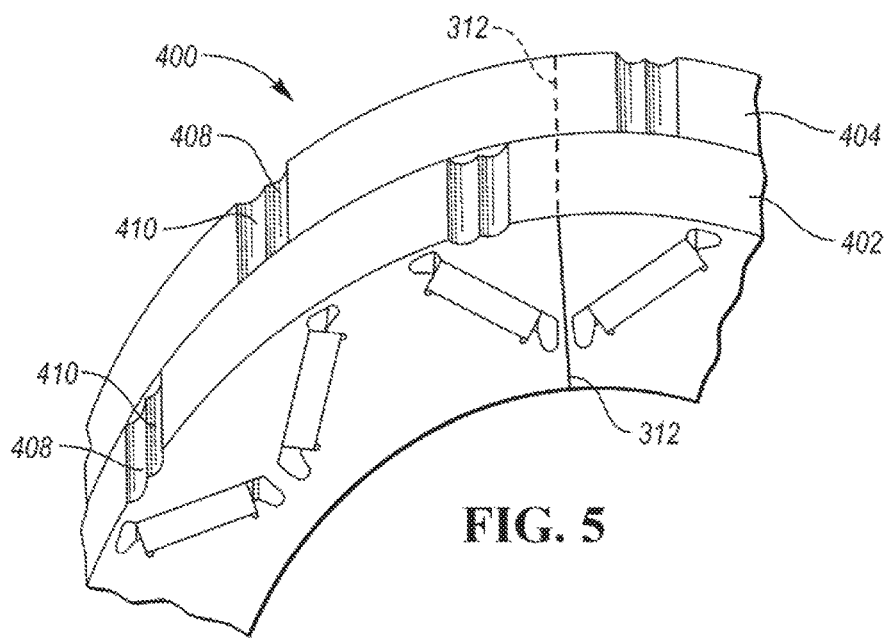
FIG. 5 depicts a rotor comprised of a first stack of laminations as in FIG. 4A and a second stack of lamination as in FIG. 4B.

FIG. 5 depicts a portion of a rotor 400 that is comprised of a first stack of laminations 402 coupled to a second stack of laminations 404. The first stack 402 and the second stack 404 are comprised of a stack of the same rotor laminations (e.g., 302 of FIG. 4A). The rotor laminations are formed with a common pattern or design and, under ideal circumstances, may be identical except for manufacturing tolerances. The laminations (e.g., 302) may define the magnetic poles of the rotor. The laminations (e.g., 302) may also define axial grooves (e.g., 308, 310) on the circumferential surface that are asymmetric about a centerline of the magnetic poles. The first stack 402 may be comprised of the same rotor laminations (e.g., 302) and may be aligned such the centerline 312 of each of the arc lengths are aligned. As such, the axial grooves defined by the same laminations are aligned to define a first axial groove 408 and a second axial groove 410 across the circumferential surface of the first stack 402.

The second stack 404 may be comprised of the same laminations as the first stack 402. However, the second stack 404 is flipped or overturned before coupling to the first stack 402. The second stack 404 also defines the first axial groove 408 and the second axial groove 410 across the circumferential surface of the second stack 404. Since the second stack 404 is flipped or overturned relative to the first stack 402, the first axial groove 408 and the second axial groove 410 associated with each of the first stack 402 and the second stack 404 are not aligned when the stacks are joined. The first stack 402 and the second stack 404 may be coupled such that centerlines associated with the poles or arc lengths corresponding to poles are aligned. A such, the axial grooves of each of the stacks are not aligned and do not form a groove that traverses axially across the entire circumferential surface defined by the first stack 402 and the second stack 404.

An advantage of the configuration described is that a single lamination design is utilized. Using a single lamination design reduces cost as each stack is comprised of a common lamination. As such, there are no additional design costs for developing additional laminations. In addition, increased volumes of the common lamination may help further reduce costs. In addition, the laminations can be designed to minimize torque ripple while minimizing the impact on the average torque produced. This leads to improved performance of the electric machine.

Figures 6A, 6B:
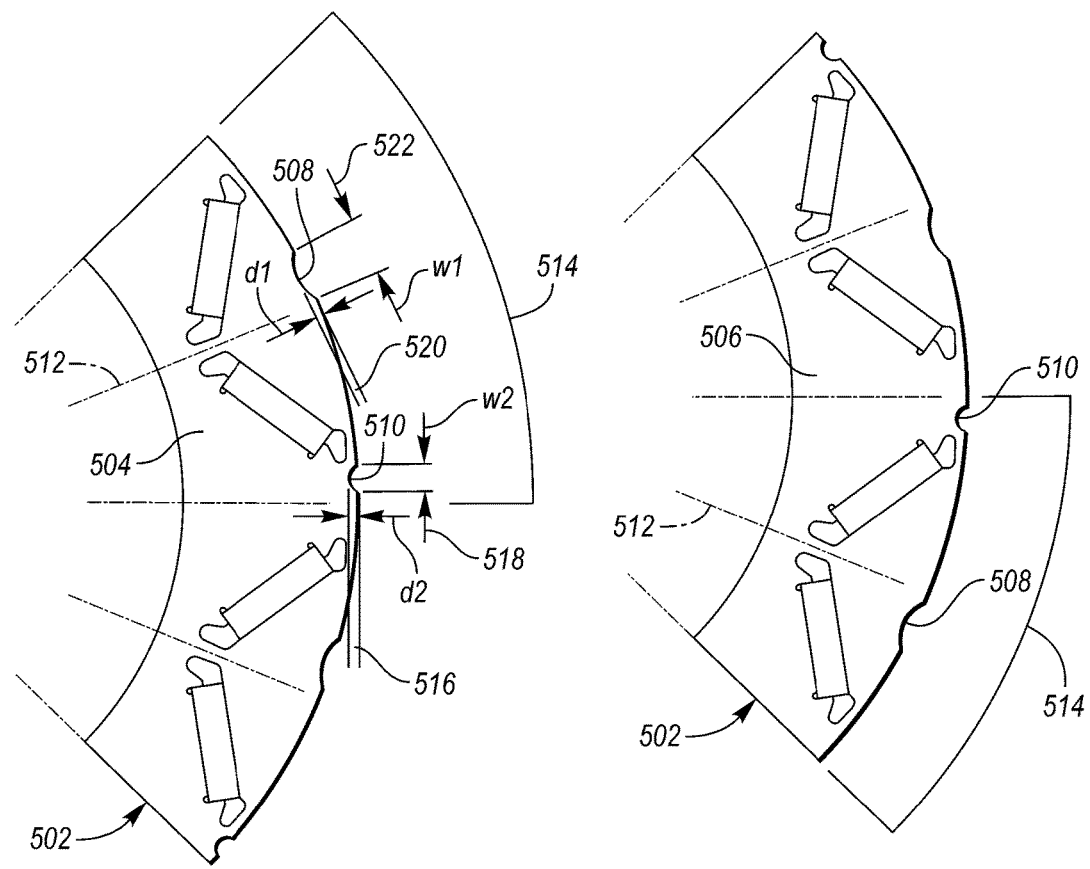
FIG. 6A is a side view of a portion of a rotor lamination viewed from a first side.
FIG. 6B is a side view of the rotor lamination of FIG. 6A viewed from a second side.

FIG. 6A depicts a portion of a rotor lamination 502 defining two poles of the rotor. FIG. 6A depicts a view in which a first face 504 of the rotor lamination 502 is visible. An arc length 514 traversing the circumferential surface may correspond to a pole of the rotor. The poles may be defined at predetermined arc lengths about the axis. A centerline 512 may bisect the arc length 514 corresponding to the pole into two equal sectors. A first groove 508 and a second groove 510 may be defined in the outer circumferential surface of the rotor lamination 502. The axial grooves may be characterized by a width and a depth parameter. For example, the first groove 508 may be characterized by a depth $d_1$ 520 and a width $w_1$ 522. The second groove 510 may be characterized by a depth $d_2$ 516, and a width $w_2$ 518. The depth $d_1$ 520 may be different than the depth $d_2$ 516. The width $w_1$ 522 may be different than the width $w_2$ 518. The depths and widths of the grooves may be selected to tune the properties of the electric machine (e.g., reduce torque ripple, maximize average torque capability).

In some configurations, the width associated with at least two of the grooves associated with each of the poles may be different. For example, $w_1$ 522 may be different that $w_2$ 518. In some configurations, the depth associated with at least two of the grooves associated with each of the poles may be different. For example, $d_1$ 520 may be different than $d_2$ 516. In some configurations, the depth and width associated with at least two of the grooves associated with each of the poles may be different. In some configurations, the axial grooves may be defined such that there are two axial grooves associated with each of the poles.

FIG. 6B depicts the rotor lamination 502 after being flipped or overturned such that a second face 506 is visible. That is, FIG. 6B represents the rotor lamination 502 that is flipped relative to that depicted in FIG. 6A.

Figure 7:
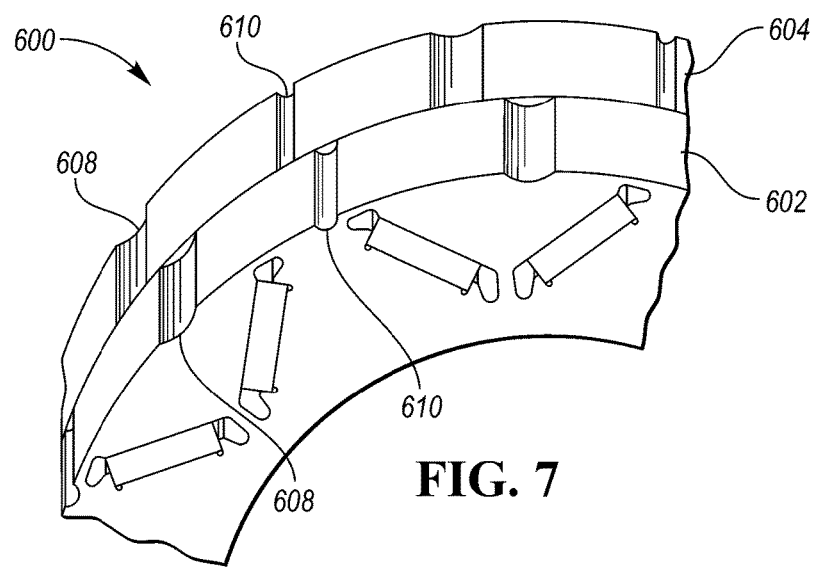
FIG. 7 depicts a rotor comprised of a first stack of laminations as in FIG. 6A and a second stack of lamination as in FIG. 6B.

FIG. 7 depicts a portion of a rotor 600 that is comprised of a first stack of laminations 602 coupled to a second stack of laminations 604. The first stack 602 and the second stack 604 are comprised of the same rotor laminations (e.g., 502 of FIG. 6A). The first stack 602 may be comprised of the same rotor laminations and may be aligned such the centerline 512 of each of the poles are aligned. As such, the axial grooves defined by the identical laminations are aligned to define a first axial groove 608 and a second axial groove 610 across the circumferential surface of the first stack 602.

The second stack 604 may be comprised of the same laminations as the first stack 602. However, the second stack 604 is flipped or overturned before coupling to the first stack 602. The second stack 604 also defines the first axial groove 608 and the second axial groove 610 across the circumferential surface of the second stack 604. Since the second stack 604 is flipped or overturned relative to the first stack 602, the first axial groove 608 and the second axial groove 610 associated with each of the first stack 602 and the second stack 604 are not aligned when the stacks are joined. The first stack 602 and the second stack 604 may be coupled such that centerlines associated with the poles or arc lengths corresponding to the poles are aligned. As such, the axial grooves do not traverse axially across the entire circumferential surface defined by the first stack 602 and the second stack 604.

The permanent magnet machine may be characterized by a torque ripple. The axial grooves may be asymmetrically positioned about the centerline 512 such that the torque ripple is reduced relative to symmetrically positioned axial grooves. That is, the formation of torque ripple is inhibited. The permanent magnet machine may also be characterized by an average torque output. The axial grooves may be asymmetrically position about the centerline 512 such that the average torque is increased relative to symmetrically positioned axial grooves.

Figure 8:
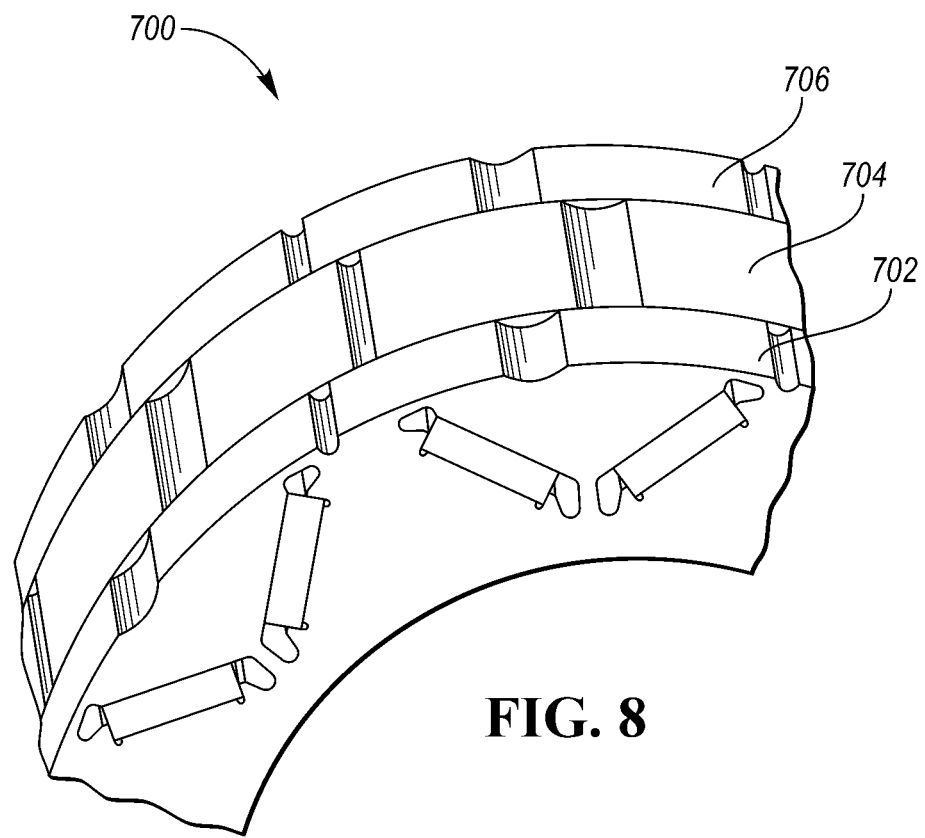
FIG. 8 depicts a rotor comprised of a first stack of laminations as in FIG. 6B disposed between a second and a third stack of lamination as in FIG. 6A.

FIG. 8 depicts a portion of a rotor 700 that is comprised of a first stack 702 of laminations, a second stack 704 of laminations, and a third stack 706 of laminations. Each of the stacks may be comprised of the same laminations (e.g., 502 of FIG. 6A). The second stack 704 may be disposed between the first stack 702 and the third stack 706. In addition, the second stack 704 may be flipped or overturned relative to the first stack 702 and the third stack 706. The stacks may be coupled such that the axial grooves of the first stack 702 and the third stack 706 are aligned and the axial grooves of the second stack 704 are not aligned with the axial grooves of the first stack 702 and the second stack 706. In such configurations, the variations and advantages described previously are also applicable.

An advantage of the multiple-section rotor configuration is that the magnitude of multiple harmonic components may be reduced. The groove pattern of each of the stacks may be configured to reduce a harmonic frequency components. By combining segments with different patterns of grooves, torque ripple created by multiple harmonic frequencies may be also reduced. The placement of the axial grooves within each pole and the number of sections may be determined to reduce selected harmonics. The figures herein depict the axial grooves but it is expected that the number of grooves and positioning of the axial grooves may be varied based on a particular motor design.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A permanent magnet machine comprising:
a rotor, configured to rotate about an axis, comprising first and second stacks of same laminations defining poles and axial grooves on a circumferential surface, wherein the axial grooves are asymmetric about a centerline of each of the poles, and coupled such that the second stack is flipped relative to the first stack and centerlines of the first stack are aligned with centerlines of the second stack.

2. The permanent magnet machine of claim 1 wherein the rotor further comprises a third stack of the same laminations and coupled such that the second stack is between the first stack and the third stack and the axial grooves of the third stack are aligned with the axial grooves of the first stack.

3. The permanent magnet machine of claim 1 wherein the axial grooves are defined by a width and the width associated with at least two of the axial grooves associated with each of the poles is different.

4. The permanent magnet machine of claim 1 wherein the axial grooves are defined by a depth and the depth associated with at least two of the axial grooves associated with each of the poles is different.

5. The permanent magnet machine of claim 1 wherein the axial grooves are defined by a width and a depth and the width and depth associated with at least two of the axial grooves associated with each of the poles is different.

6. The permanent magnet machine of claim 1 wherein the axial grooves are defined such that there are two axial grooves associated with each of the poles.

7. The permanent magnet machine of claim 1 wherein the axial grooves are asymmetrically positioned about the centerline to inhibit formation of torque ripple relative to symmetrically positioned axial grooves.

8. The permanent magnet machine of claim 1 wherein axial grooves are asymmetrically positioned about the centerline to increase an average torque output relative to symmetrically positioned axial grooves.

9. A rotor for a permanent magnet machine comprising:
first and second stacks of same laminations, configured to rotate about an axis and defining poles and axial grooves on a circumferential surface wherein the axial grooves are asymmetric about a centerline of each of the poles, and coupled such that the second stack is flipped relative to the first stack and centerlines of the first stack are aligned with centerlines of the second stack.

10. The rotor of claim 9 further comprising a third stack of the same laminations coupled such that the second stack is between the first stack and the third stack and the axial grooves of the third stack are aligned with those of the first stack.

11. The rotor of claim 9 wherein the poles are defined at predetermined arc lengths about the axis, the axial grooves are defined by a width, and the width associated with at least two of the axial grooves associated with each of the poles is different.

12. The rotor of claim 9 wherein the poles are defined at predetermined arc lengths about the axis, the axial grooves are defined by a depth, and the depth associated with at least two of the axial grooves associated with each of the poles is different.

13. The rotor of claim 9 wherein the poles are defined at predetermined arc lengths about the axis, the axial grooves are defined by a width and a depth, and the width and depth associated with at least two of the axial grooves associated with each of the poles are different.

14. The rotor of claim 9 wherein the axial grooves are asymmetrically positioned about the centerline to reduce torque ripple of the permanent magnet machine relative to symmetrically positioned axial grooves.

15. The rotor of claim 9 wherein the axial grooves are asymmetrically positioned about the centerline to increase an average torque of the permanent magnet machine relative to symmetrically positioned axial grooves.

16. A rotor for a permanent magnet machine comprising:
first and second stacks of same laminations, configured to rotate about an axis and defining poles and axial grooves on a circumferential surface wherein the axial grooves are asymmetric about a centerline of each of the poles, oriented such that the axial grooves are aligned; and
a third stack of the same laminations, flipped relative to the first and second stacks and disposed between the first and second stacks such that axial grooves defined by the third stack are unaligned with the axial grooves of the first and second stacks.

17. The rotor of claim 16 wherein the poles are defined at predetermined arc lengths about the axis, the axial grooves are defined by a width, and the width associated with at least two of the axial grooves associated with each of the poles is different.

18. The rotor of claim 16 wherein the poles are defined at predetermined arc lengths about the axis, the axial grooves are defined by a depth, and the depth associated with at least two of the axial grooves associated with each of the poles is different.

19. The rotor of claim 16 wherein the poles are defined at predetermined arc lengths about the axis, the axial grooves are defined by a width and a depth, and the width and depth associated with at least two of the axial grooves associated with each of the poles is different.

20. The rotor of claim 16 wherein the axial grooves are asymmetrically positioned about the centerline to increase an average torque relative to symmetrically positioned axial grooves.

* * * * *